Sept. 14, 1926.
H. L. THACKWELL
1,599,731
SLUDGE TANK AND GAS PRODUCER
Filed June 22, 1925   4 Sheets-Sheet 1
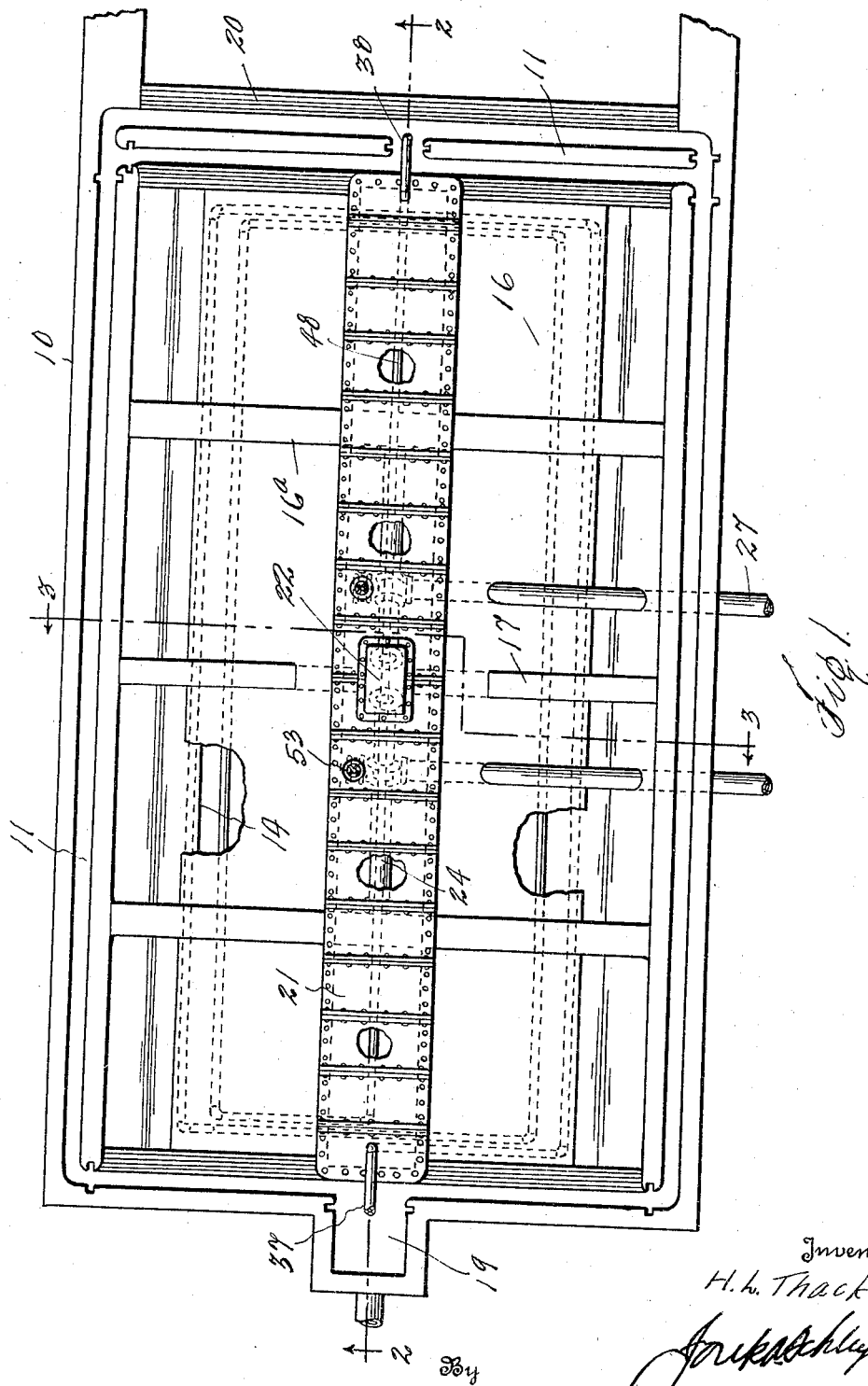

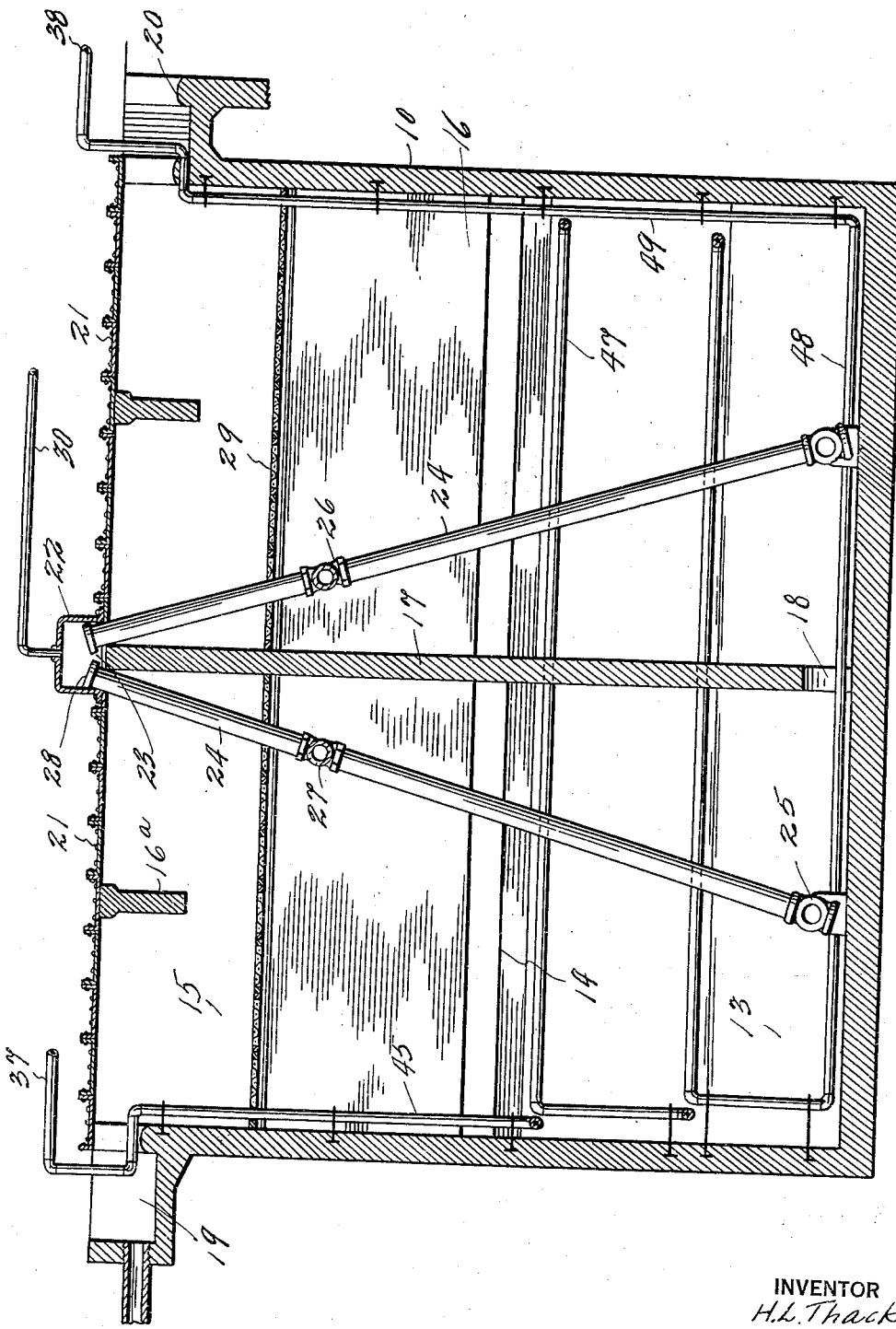

Sept. 14, 1926.
H. L. THACKWELL
1,599,731
SLUDGE TANK AND GAS PRODUCER
Filed June 22, 1925    4 Sheets-Sheet 3
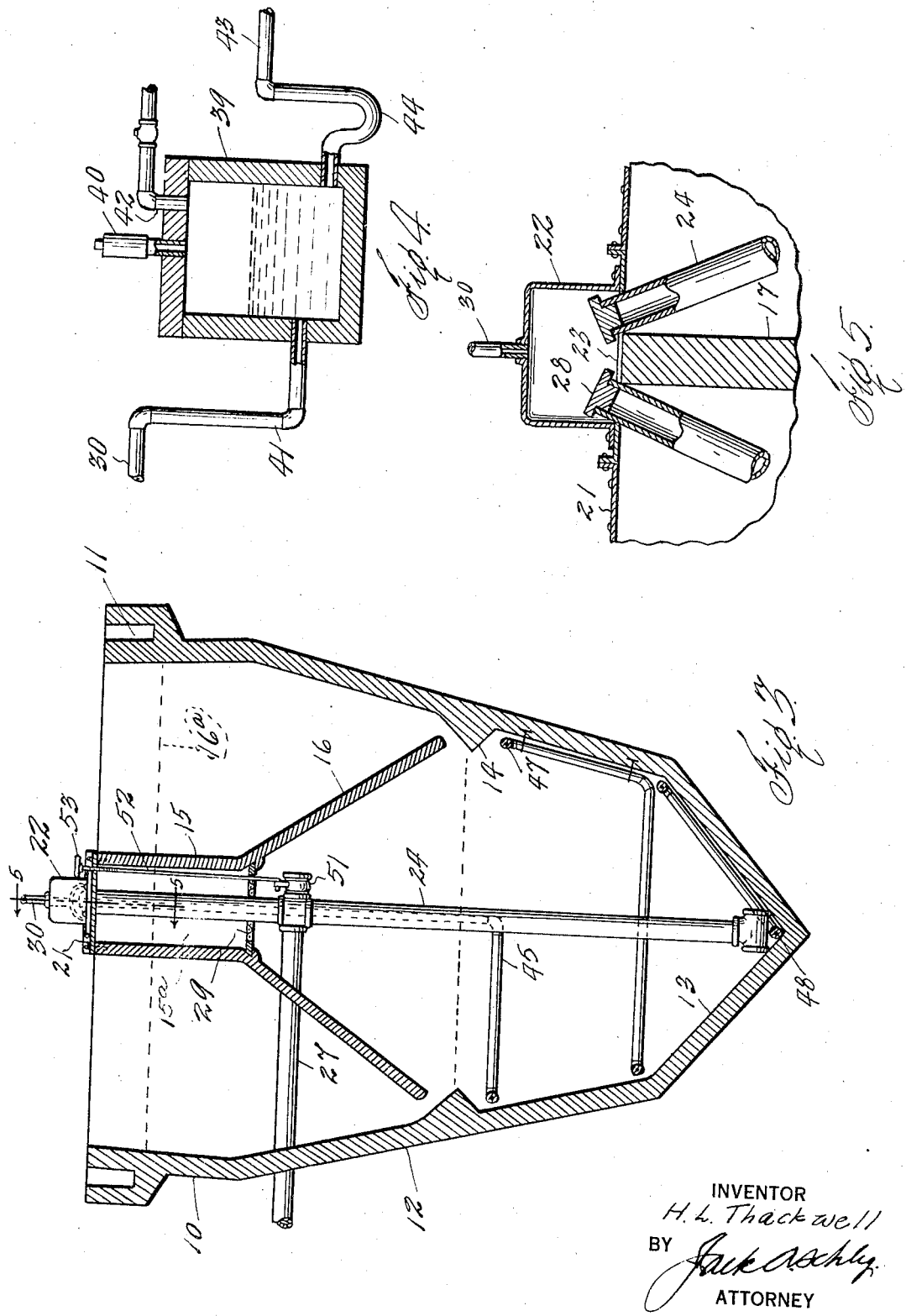
INVENTOR
H. L. Thackwell
BY
Jack A Ashley
ATTORNEY Sept. 14, 1926.
H. L. THACKWELL
1,599,731
SLUDGE TANK AND GAS PRODUCER
Filed June 22, 1925    4 Sheets-Sheet 4
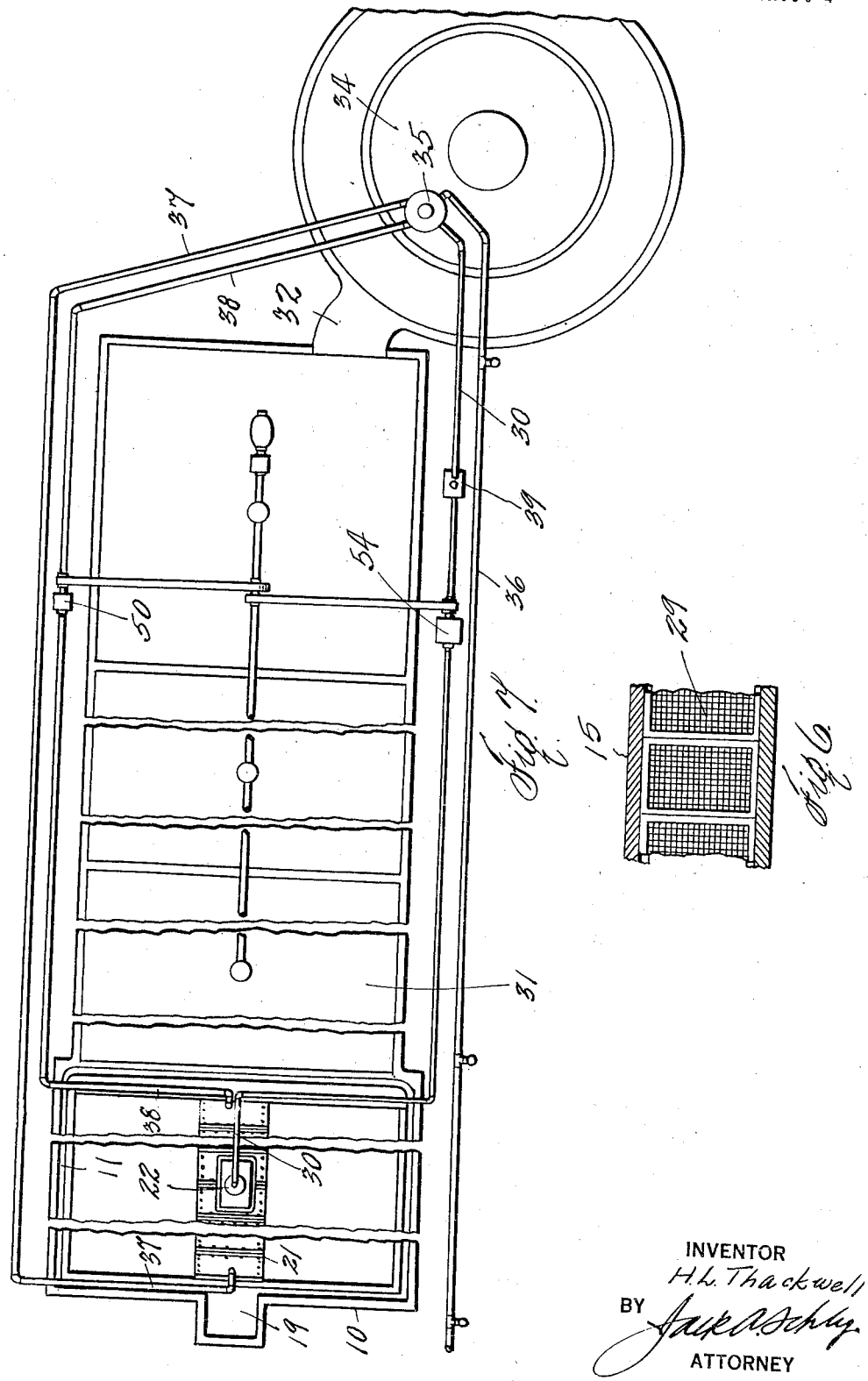
INVENTOR
H. L. Thackwell
BY
ATTORNEY Patented Sept. 14, 1926.

1,599,731

UNITED STATES PATENT OFFICE.

HENRY L. THACKWELL, OF DALLAS, TEXAS, ASSIGNOR OF ONE-HALF TO FRED A. JONES, OF DALLAS, TEXAS.

SLUDGE TANK AND GAS PRODUCER.

Application filed June 22, 1925. Serial No. 38,695.

This invention relates to new and useful improvements in sludge tanks and gas producers.

The invention has to do with that portion of sewage disposal plants wherein the effluent is received and digested, prior to being aerated and clarified.

The object of the invention is to stimulate the bacterial digestion of sludge by an increased temperature and more vigorous activity of the bacteria.

Another object of the invention is to obviate odors and to utilize the generated gas for fuel for heating a medium for heating the sludge.

A further object of the invention is to obtain an increase in the total digestion of the sludge, thus requiring less capacity and making for economical results.

Another object is to reduce the residue of the sludge thus requiring less drying area for such residue.

A still further object of the invention is to retard the upward passage of the mass into the throat of the gas collecting chamber or hopper, thereby preventing the formation of scum on top of the effluent in said chamber.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is a plan view of a tank constructed in accordance with my invention,

Fig. 2 is a longitudinal vertical sectional view taken on the line 2—2 of Fig. 1, Fig. 3 is a transverse vertical sectional view taken on the line 3—3 of Fig. 1, Fig. 4 is a vertical sectional view of the gas trap, Fig. 5 is an enlarged vertical sectional view taken on the line 5—5 of Fig. 3, Fig. 6 is a detail of the scum screen, and Fig. 7 is a fragmentary plan view of the disposal plant in which the invention is shown.

In the drawings the numeral 10 designates a purification tank of the inverted conical type. This tank has a gutter 11 around its upper edge surmounting the upright walls at the upper portion of said tank. Inclined side walls 12 lead down from the upright walls to a hopper bottom 13. About midway of the walls 12 are longitudinal abutments or ledges 14 having inclined surfaces so as to prevent lodgement of solids thereon.

Vertical partitions 15 extend longitudinally on each side of the center of the tank and from the bottom of each partition, a septum 16 inclines downwardly and outwardly so that its lower end overhangs the upper side of the adjacent abutment, but is spaced therefrom. By this arrangement the abutments 14 extend inwardly beyond the lower ends of the septums, thereby deflecting uprising gases into the hood formed by the septums.

Transverse beams 16ª extend across the upper open end of the tank. A vertical partition 17 extends vertically at the center of the tank. This partition has an opening 18 in the hopper bottom 13. An influent sluice 19 is provided at one end of the tank and weirs 20 are provided at the other end of the tank over which the effluent flows. That portion of the tank confined between the walls 15 constitutes a gas chamber 15ª; while within the hood defined by the septums 16 is formed a transition chamber. The spaces on each side of the walls 15 and 16 and below the ledges 14 form a sedimentation chamber.

The top of the gas chamber is sealed by transverse flanged metal plates 21 bolted together and constituting a cover. These plates are suitably fastened on top of the walls 15. At the center of the cover a cap 22 is bolted to the plates over an opening 23. Inclined sludge discharge pipes 24 are disposed on each side of the partition 17. Each pipe has a four-way fitting 25 at its lower end and includes a four-way connection 26 from which a discharge pipe 27 leads through the adjacent septum and side wall 12 of the tank. The top of each pipe extends into the cap 22 and is closed by a cover 28. By removing the cap and cover 28, the pipe 24 may be swabbed out with a wire brush or other cleaning device.

The sludge level is usually at the same elevation as the abutments 14 and to maintain this level the sludge is pumped out through the pipes 24 and 27. The level of the effluent or liquid which rises and passes out of the tank is controlled by the weirs 20. As before stated the gas rises in the hood or transition chamber and passes up into the gas chamber. Scum forms on top of the effluent in the gas chamber and frequently becomes so heavy as to hold back the gas, with disastrous results. To overcome this a screen 29 is secured in the upper end of the transition chamber at the bottom of the gas chamber (Fig. 3). This screen may be formed of a coarse mesh, such as is used for sand and gravel screens or of any other foraminous material. The function of the screen is to retard the upward passage of the particles and to break up scum formations so that the gas will have a free upward passage.

The cover formed by the plates 21 traps the gas which rises into the cap 22 from which it is conducted by a pipe 30. The effluent flowing over the weirs 20 passes into a mechanical aerator 31 (Fig. 7) from which it flows through a sluice 32 into a clarifier, such as is shown in my co-pending application Serial No. 23,442, filed April 16, 1925. In the house 34 of the clarifier I install a suitable water heater 35 preferably of the coil type. A water supply pipe 36 leads to the heater and the gas pipe 30 also extends to the heater for supplying fuel for the operation of said heater. A hot water pipe 37 leads from the heater to the tank 10 and a cold water return pipe 38 leads from the tank to the heater.

In the gas pipe 30 is connected a trap consisting of a receptacle 39 (Fig. 4) partially filled with water. This trap has a release valve 40 of suitable construction mounted on its top and set to release the gas at a predetermined pressure. The pipe 30 is bent down at 41 to enter the trap below its water level and leaves said trap above its water level at 42. A water gravity feed pipe has a goose neck 44 entering the bottom of the receptacle.

The water in the trap will be maintained at the same level as the pipe 43. Should the gas explode or ignite between the trap and the heater 35 the water would check its passage back to the tank 10 and the valve 40 would release the excessive pressure.

The hot water supply pipe 37 is connected to a vertical pipe 45 leading down to a coil immersed in the tank. The coil comprises pipes 47 extending along the sides and across the ends of the tank and running continuously downward to a bottom pipe 48 extending along the center of the bottom of the tank and connected to a riser 49. The riser is connected to the return pipe 3.

It will be seen that by placing a pump 50 in the return pipe 38 the hot water from the heater 35 is circulated through the coil thus heating the sludge and raising its temperature so that its biological activity is greatly increased and accelerated, thereby producing a more perfectly digested sludge and also digesting more sludge in a smaller compartment. Gate valves 51 (Fig. 3) may be mounted on the connections 26 and operated each by a hand wheel 53 and rod 52. By opening these valves the scum may be drawn off.

An exhauster 54 may be connected in the gas pipe 30 for exhausting the gases from the tank and cover. Some of the sewage gases may be heavier than air and will readily leave the scum unless they are mechanically drawn therefrom.

Various changes in the size and shape of the different parts, as well as modifications and alterations may be made within the scope of the appended claims.

What I claim, is:

1. A sewage purification tank having longitudinal abutments on each side, longitudinal septums inclining upwardly from the abutments, a gas accumulating chamber above the septums extending longitudinally of the tank, sludge removing pipes extending to the bottom of the tank, a cover for the gas chamber, a cap on the cover, and a gas conductor leading from the cap.

2. A sewage purification tank having longitudinal abutments on each side, longitudinal septums inclining upwardly from the abutments, a gas accumulating chamber above the septums extending longitudinally of the tank, sludge removing pipes extending to the bottom of the tank, a cover for the gas chamber, a cap on the cover, a gas conductor leading from the cap, fluid circulating pipes in the tank below the septums, and means for supplying a hot fluid to said pipes.

3. In a sewage purifying tank, a sludge chamber in the bottom of the tank, a hood in the upper portion of the tank, baffles under the edges of the hood, a gas accumulating chamber above the hood extending longitudinally of the tank, a cover for said gas chamber extending longitudinally of the tank, and a cap on and above said cover.

4. In a sewage purifying tank, a sludge chamber in the bottom of the tank, a hood in the upper portion of the tank, baffles under the edges of the hood, a gas accumulating chamber above the hood, a cover for said chamber, a cap removably mounted on said cover, and sludge removing pipes having extensions communicating with said cap.

5. In a sewage disposal plant, a purification tank having a sludge chamber at its bottom, a hood over the sludge chamber, a gas chamber connected with the top of the hood, a cover over the gas chamber, a heating coil in the sludge chamber, a water heater, a fuel supply pipe leading from the cover of the gas chamber to the heater, a water circulating pipe leading from the heater to the tank, a water return pipe leading from the tank to the heater, a circulating coil in the sludge chamber connected to said circulating and return pipes.

6. A sewage purification tank having longitudinal abutments on each side, longitudinal septums inclining upwardly from the abutments, a gas accumulating chamber extending longitudinally of and over the septums, sludge removing pipes extending to the bottom of the tank, a cover for the gas chamber extending longitudinally of the tank, a cap on the cover, a gas conductor leading from the cap, and an exhauster connected in the gas conductor.

7. In a sewage disposal plant, a purification tank having a longitudinal sludge chamber at its bottom, a hood over the sludge chamber extending longitudinally thereof, a gas chamber above and contiguous to the top of the hood, a cover closing the top of the gas chamber and extending longitudinally of the tank, a heating coil in the sludge chamber, and means at the level of the sludge for breaking up scum formations.

In testimony whereof I affix my signature.

HENRY L. THACKWELL.